United States Patent

Dawes et al.

(10) Patent No.: US 6,466,707 B1
(45) Date of Patent: Oct. 15, 2002

(54) PHASAR ATHERMALIZATION USING A SLAB WAVEGUIDE

(75) Inventors: Steven B. Dawes, Corning, NY (US); Nikolaus Boos, Fontainbleau; Sophie Vallon, St Michel sur Orge, both of (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/642,984

(22) Filed: Aug. 21, 2000

(51) Int. Cl.$^7$ .............................. G02B 6/12; G03F 7/26
(52) U.S. Cl. ........................ 385/14; 385/46; 385/123; 430/314
(58) Field of Search .................. 385/14, 46, 115, 385/123, 131, 147, 132; 430/311, 313, 314

(56) References Cited

U.S. PATENT DOCUMENTS

| | | | |
|---|---|---|---|
| 5,799,118 A | 8/1998 | Ogusu et al. | 385/14 |
| 5,938,811 A | 8/1999 | Greene | 65/385 |
| 6,137,939 A | * 10/2000 | Henry et al. | 385/132 |
| 6,169,838 B1 | 1/2001 | He et al. | 385/129 |
| 6,181,848 B1 | 1/2001 | Bruno et al. | 385/24 |

FOREIGN PATENT DOCUMENTS

| | | |
|---|---|---|
| CA | 2291405 | 10/2000 |
| EP | 0919840 | 6/1999 |
| WO | WO99/21038 | 4/1999 |

OTHER PUBLICATIONS

Kurokawa et al. "Terabit Optical Signal Processing Based on Time–Space–Conversion," Leos 99. IEEE Lasers and Electro–Optics Society 1999; pp. 188–189 vol. 1.*
Yamauchi et al., "Analysis of the Far Field Pattern of an Optical Waveguide Array Using finite–Difference Beam––Propagation Method"; Microwaves, Antennas and Propagation, IEE Proceedings vol. 145; Apr. 1998; pp. 175–178.*

* cited by examiner

Primary Examiner—Phan T. H. Palmer
(74) Attorney, Agent, or Firm—Price, Heneveld, Cooper, DeWitt & Litton

(57) ABSTRACT

A passive temperature-compensated integrated optical component having an array of adjacent waveguides, and a slab waveguide located within a groove at an intermediate section of the array. The waveguides have an index of refraction that increases with increasing temperature, and the slab waveguide has an index of refraction that decreases with increasing temperature. The slab waveguide compensates for a temperature-induced change in the refractive index of the waveguides to maintain a generally constant optical path difference between the adjacent waveguides over a temperature range.

13 Claims, 4 Drawing Sheets

PHASAR ATHERMALIZATION USING A SLAB WAVEGUIDE

BACKGROUND OF THE INVENTION

1. Field of the Invention

The present invention relates generally to integrated optical (or "planar") waveguides or components for use in the field of optical communications and information processing, and particularly to an athermalized integrated optical waveguide or component wherein a phased-array type wavelength division multiplexer or demultiplexer (WDM) is employed as a representative example.

2. Technical Background

Optical communications and information processing components which utilize an integrated optical (or "planar") platform—such as planar wavelength division multiplexers and demultiplexers (WDMs) as a representative example—require precise control over the optical path difference between adjacent waveguides. The optical path difference is the product of the effective index of refraction of the fundamental mode in the waveguide and the physical path difference between adjacent waveguides. The effective index of refraction of the fundamental mode in the waveguides and the physical path difference between adjacent waveguides are typically both temperature-dependent. In conventional integrated optical WDM components, the medium forming the arrayed waveguides has a noticeable temperature dependency. As a result, temperature variations in the usual operating temperature range (from about 0° C. to about 70° C.) induce a wavelength shift in centered channel position which is unacceptable in comparison to the typical accuracy requirements (about 0.1 nm) as it may exceed the transmission bandwidth.

Consequently, available WDM optical components of the phased-array type are generally operated in a temperature-controlled environment. Typically, control circuits with heating elements are provided to ensure a stable temperature environment. However, the use of heating elements to achieve active athermalization is undesirable because it increases the overall cost, size, and complexity of the component, and the consumption of considerable power.

In the case of conventional WDMs having a phased-array optical grating comprised of a plurality of silica waveguides and silica cladding, the variation of channel wavelength as a function of temperature predominantly depends on the positive variation of the effective index of refraction of the waveguides with temperature. In an effort to compensate for the positive variation of refractive index as a function of temperature for silica-based materials, polymer overcladding materials having a negative variation of refractive index as a function of temperature have been employed. However, a problem with this arrangement is that, as the temperature varies, the difference in refractive index between the core and the cladding varies, and this may induce temperature-dependent loss. As a result, optical WDM components having a phased-array type grating with a polymer overcladding may not be suitable for use over a wide range of ambient temperatures. Another problem with this optical fiber structure is that the polymer overcladding makes it more difficult to connect optical fibers to the input and output ports of the component.

Another proposed design for maintaining a relatively constant optical path difference between adjacent waveguides in a phased array involves localizing a polymer in a triangular groove in the phased array. The groove is etched in the center of the phased array through the cladding and the waveguides and is filled with a polymer, typically a silicone polymer. The ratio of the optical path difference between adjacent waveguides in the silica region to the optical path difference in the groove can be selected to cancel, or at least minimize, the variation in the mean channel wavelength as a function of temperature. An advantage of the groove design as compared with the overclad design is that the polymer is localized in the middle of the component. This avoids the problem associated with connecting a polymer overcladding component to optical fibers. However, phased-array components having a polymer-filled triangular groove may exhibit a loss of about 2 dB in excess of standard phased-array components. This loss is believed to be attributable to free-space propagation of light into the groove since light propagates freely in the groove, and is only partially collected by the output waveguides of the phased-array component. The estimated loss for such a waveguide increases as a function of the path length in the groove and is not constant, but depends on the number of waveguides in the phasedarray component.

It is useful to identify and isolate two axes of optical free space propagation in the polymer-filled groove of a phased array optical WDM component. These axes include a free-space axis of propagation perpendicular to the waveguides in the array and parallel to the planar substrate (hereafter called the horizontal axis) and a freespace axis of propagation in a direction perpendicular to the waveguides in the array and perpendicular to the planar substrate (hereafter called the vertical axis).

Several solutions have been proposed to reduce losses due to free-space propagation. A first technique which has been proposed is to deconvolute the groove into several grooves having a short free-space length, each groove contributing very small propagation loss such that the total excess loss due to free-space propagation in the grooves is less than about 0.5 dB. Application of this technique is, however, limited because of backreflectance. Current product specifications require less than −45 dB return loss, and it is anticipated that the return loss specification may be less than −55 dB in the future. The combination of multiple reflective interfaces with the fundamental index mismatch that is needed to accomplish athermalization places severe design constraints on the reflection losses. Factors such as providing angled grooves, reflected beam coherence, and the temperature dependence of the reflected beam propagation in these components would make current targets difficult to meet, and could make future targets impossible to achieve. Further, the deep etching process used to make the grooves in glass typically introduces a width error of up to about 1 micrometer. When many narrow grooves are employed, the path length error is amplified so that significant cross talk degradation can result.

Another proposed design for reducing free-space propagation losses in a polymer-filled groove of an athermalized phased-array WDM involves the use of tapered waveguides which collimate the light signal. In this arrangement, each of the waveguides in the phased array are flared at a section immediately adjacent to the polymer-filled groove to achieve an optical loss of about 40 to 50% less free-space propagation loss as compared with a similar component in which each of the waveguides in the phased array has constant cross-sectional dimensions along its entire length. In the flared section of each waveguide, the width of the waveguide core (defined as the waveguide core dimension parallel with the planar substrate and perpendicular to the length direction of the waveguide) gradually increases from a location a short distance away from the polymer-filled groove toward a location abuttingly adjacent to the polymer-filled groove. The flared sections of the waveguides can be formed using conventional etching techniques. However, the thickness (defined as a dimension perpendicular to the planar substrate and perpendicular to the length of the waveguide) of the waveguides is constant along the entire length of the waveguides because conventional techniques for fabricating integrated optical components do not allow precise variations in the thickness of the various layers of material comprising the optical component. As a result, the flared sections of the waveguides can only reduce horizontal free-space propagation losses, and, therefore, can only achieve a maximum loss reduction of 50% since the thickness of the cores of the waveguides cannot be varied to reduce vertical free-space propagation losses.

Another known technique for reducing free-space propagation losses in the polymer-filled groove of an athermalized phased-array WDM component involves etching the vertical walls of the groove with hydrofluoric acid to oblate the original dimensions of the groove. Since the core glass etch-rate is significantly lower than the cladding glass etchrate, the core protrudes from the groove wall. The component is then processed at a high temperature to melt the protruding core glass to form a convex profile that acts as a lens. The lens as formed is said to collimate the beam and enable greater than 50% loss reduction as compared with an otherwise similar component in which the technique involving ablation etching and melting to form a lens is not employed.

There remains a need for optical WDM components of the phased-array type in which the optical-path difference between adjacent waveguides in the phased-array region can be more precisely controlled to minimize wavelength shifts to an acceptable level while also minimizing power loss in the transmitted signals without the use of active temperature control means, such as heating elements or the expensive processing techniques employed in the prior art.

SUMMARY OF THE INVENTION

This invention pertains to a temperature-compensated integrated optical component having a plurality of adjacent waveguides, and to a method for making such a component. The temperature-compensated integrated optical component exhibits very low optical losses that are comparable to those of athermalized components employing a heating element The method of the present invention can potentially be employed for making athermalized integrated optical components having a slab waveguide disposed in a groove intersecting an array of adjacent waveguides of different lengths, wherein freespace propagation losses in the slab waveguide are negligible (or at least extremely low), and in which reflective losses at core-to-core interfaces are also minimized.

A representative example of a temperature-compensated integrated optical component in accordance with the present invention is disclosed for demonstrative purposes, and includes a planar substrate that either acts as an undercladding or includes an undercladding disposed on the substrate, an optical circuit such as a phased array of adjacent waveguides, and a slab waveguide located in a groove intersecting the phased array. The groove extends to a depth lower than the bottom surface of the waveguides. The phased array includes a plurality of waveguide cores of different lengths supported on the undercladding, with adjacent waveguide cores having a path length difference that is identical for any pair of adjacent waveguides. The groove may be located in a region where the waveguide cores have a straight waveguide segment. The waveguide cores have an index of refraction that increases with increasing temperature. The slab waveguide includes an undercladding layer disposed on the bottom of the groove, a slab core layer disposed over the undercladding layer, and an overcladding layer disposed over the slab core layer. The slab core has an index of refraction that decreases with increasing temperature to compensate for a change in the refractive index of the waveguide cores associated with a temperature change, and thereby maintains a constant optical path difference between adjacent waveguides over the normal operating temperature range.

By forming a slab waveguide having a slab core with planarized upper and lower surfaces aligned with upper and lower surfaces of the plurality of waveguide cores, and by providing an adjacent undercladding and an adjacent overcladding for the slab core, light entering the slab core is guided to eliminate, or at least substantially reduce, vertical free-space propagation losses.

In accordance with another aspect of the invention, the component described above can be modified to further comprise features that limit free-space propagation lengths or collimate light to reduce horizontal free-space propagation losses.

Another aspect of the invention pertains to a method for making a temperature-compensated planar-optical component. The method involves providing an optical component including a substrate that either acts as an undercladding or includes an undercladding layer on the substrate, forming a plurality of waveguide cores of different lengths on the undercladding, and disposing an overcladding over the waveguide cores. Adjacent waveguide cores may have a path length difference that is identical for any pair of adjacent waveguides. The component includes a groove intersecting the waveguides that extends to a depth lower than the bottom surface of the waveguides, and divides each of the waveguides into a first segment and a second segment separated by a free space. In the example of a phased array of waveguides, the waveguides may be generally curved, and the groove may be formed in a region of the waveguides this is generally straight and have a substantially triangular boundary. Next, an undercladding is formed on the bottom of the groove. The undercladding may be provided with a planar upper surface located in a plane generally coincident with the lower surfaces of the waveguide cores. A slab core is then formed within the groove above the undercladding. The slab core may also be provided with a planar upper surface located in a plane generally coincident with the upper surfaces of the waveguide cores. Thereafter, an overcladding layer is formed over the slab core.

Additional features and advantages of the invention will be set forth in the detailed description which follows, and will be apparent to those skilled in the art from the description or recognized by practicing the invention as described in the description which follows, together with the claims and appended drawings.

It is to be understood that the foregoing description is exemplary of the invention only, and is intended to provide an overview for the understanding of the nature and character of the invention as it is defined by the claims. The accompanying drawings are included to provide a further understanding of the invention, and are incorporated into and constitute part of the specification. The drawings illustrate various features and embodiments of the invention which, together with their description, serve to explain the principles and operation of the invention.

DETAILED DESCRIPTION OF THE PREFERRED EMBODIMENTS

Figure 1:
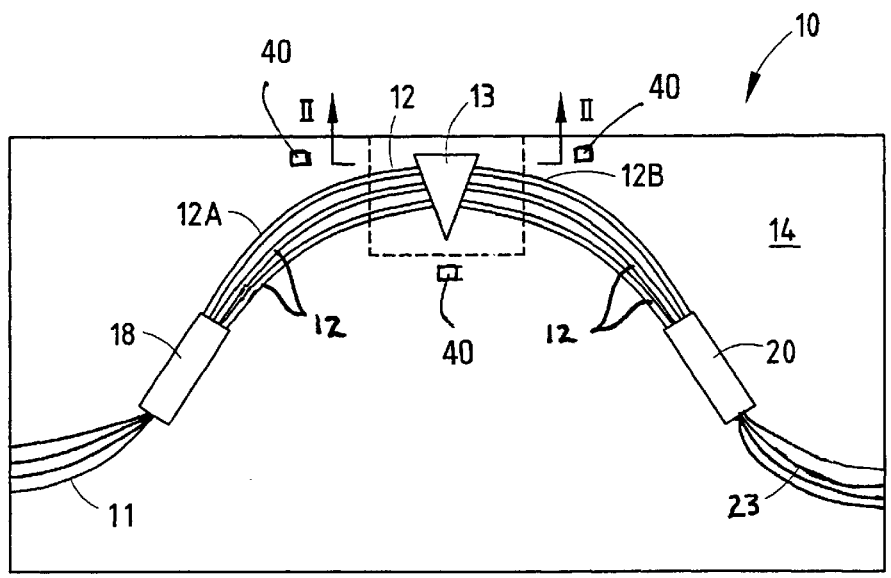
FIG. 1 is a schematic top view of a phased-array wavelength division WDM component with a substantially triangular groove and positioning pads.

The present invention is disclosed and described herein with reference to a passively athermalized optical waveguide component 10 having a plurality of adjacent waveguides 12 as shown in FIG. 1, as well as the method for making such a component 10. As used herein, a passively athermalized optical waveguide component refers to a component in which the overall optical characteristics are relatively independent of temperature over a predetermined temperature range (i.e., the output signals from the component are primarily dependent on the input signals to the component and are substantially independent of temperature), and in which the athermalization does not require power consumption to control a heating element.

For the purpose of depicting a representative and exemplary embodiment the present invention, the passively athermalized optical waveguide component 10 is shown as a wavelength division multiplexer or demultiplexer (WDM) employing an optical phased-array of waveguides including one or more input waveguides 11, a first slab waveguide or coupler 18, an arrayed waveguide comprised of a plurality of curved waveguides 12, a second slab waveguide or coupler 20, and one or more output waveguides 23.

Figure 3:
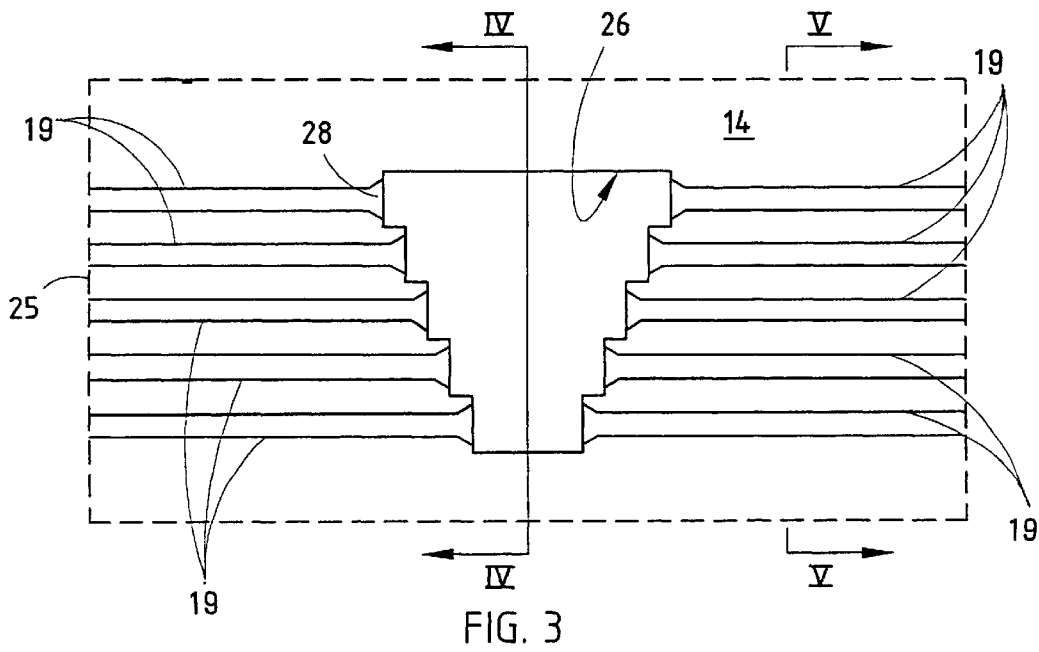
FIG. 3 is a greatly enlarged schematic cross-sectional view of a section of the phased-array wavelength division WDM component of FIGS. 1 and 2 taken along section line III—III of FIG. 2.
Figure 4:
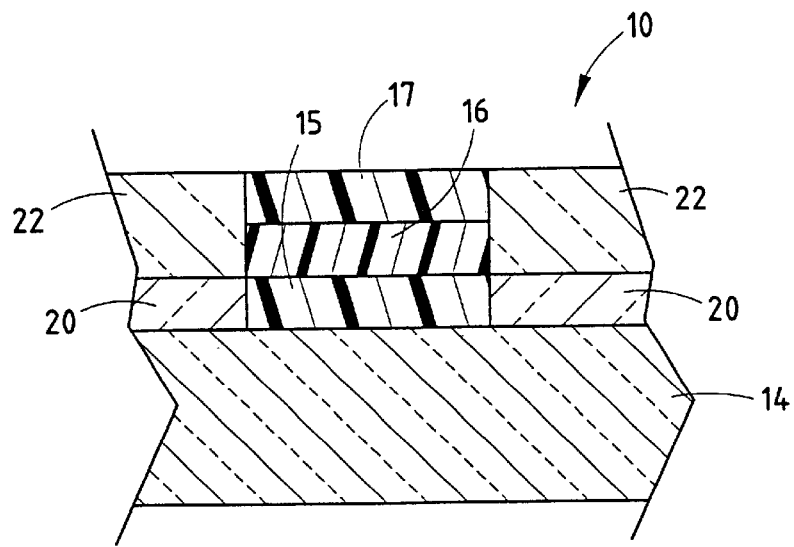
FIG. 4 is a schematic cross-sectional view of the component shown in FIGS. 1–3 taken along section line IV—IV of FIG. 3.

The array of waveguides 12 between couplers 18 and 20 are arrayed in a curved or generally C-shaped configuration. The apex of the curved pattern of waveguides is substantially flat as seen in FIG. 3. A straight waveguide segment is added at the apex of the curved waveguides in order to provide a region where light propagates in a straight line. Each successive waveguide provides a geometrical path which is longer than that of its predecessor by a constant amount ΔL. A slab waveguide 13 is disposed in a groove intersecting the plurality of waveguides 11. The slab waveguide 13 is located in a central or intermediate section of the phased array, as shown in the drawing Figures and described hereafter. However, slab waveguide 13 may be located in another region of the phased array or in couplers 18, 20. Slab waveguide 13 may also be divided into two or more smaller slab waveguides 13 which are proximately or remotely located relative to one another. The plurality of waveguides 11 are in an asymmetrical arrangement, with each waveguide comprising two segments including a first segment 12A defined by a silica core, and a second segment 12B defined by a silica core. Disposed between first waveguide segments 12A and waveguide segments 12B is a slab waveguide 13.

Figure 2:
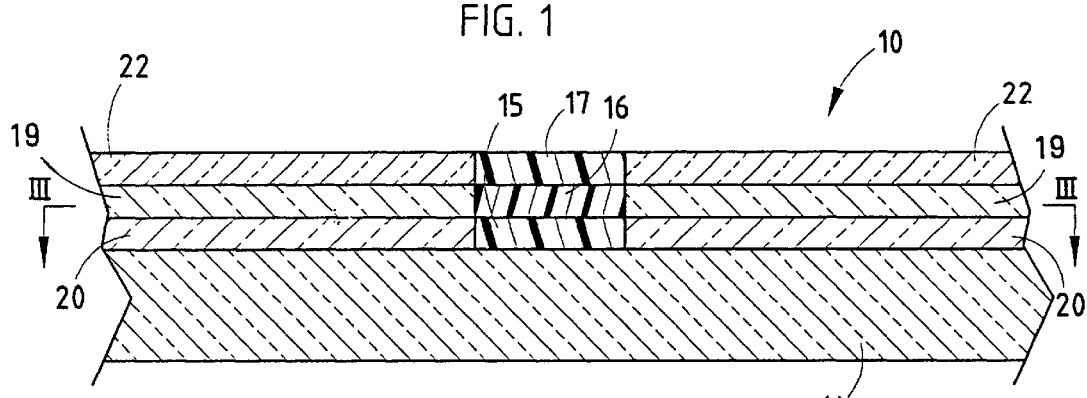
FIG. 2 is a schematic cross-sectional view of the component shown in FIG. 1 taken along section line II—II of FIG. 1.
Figure 5:
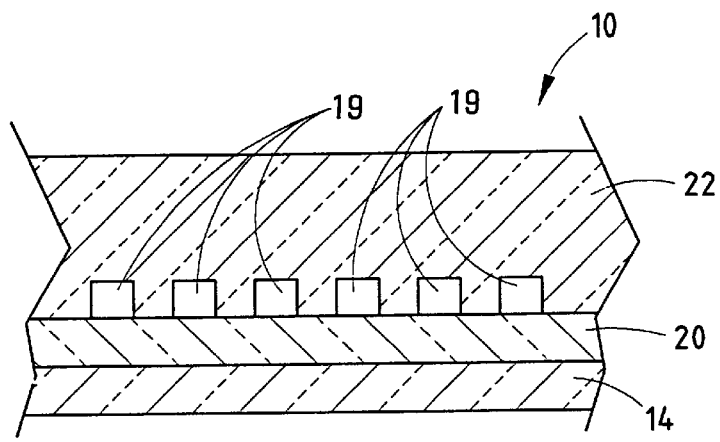
FIG. 5 is a schematic cross-sectional view of the component shown in FIGS. 1–4 taken along section line V—V of FIG. 3.

As shown in FIGS. 2 and 5, waveguides 12A and 12B are comprised of waveguide cores 19 made of a material that is transparent to light at the signal wavelengths and which has a refractive index that increases with increasing temperature. Waveguides 12A and 12B include an undercladding layer 20 that has a refractive index that is less than the refractive index of waveguide cores 19, and an overcladding layer 22 that is generally disposed over waveguide cores 19 and which also has a refractive index that is less than the refractive index of waveguide cores 19. Undercladding layer 20 and overcladding layer 22 together completely surround waveguide cores 19. Undercladding layer 20 and overcladding layer 22 may be comprised of the same or different material, but in either case, the refractive indices of the cladding layers 20 and 22 must remain less than the refractive index of waveguide cores 19 over the operating temperature range of the component. Waveguide cores 19 and cladding layers 20 and 22 form optical waveguides which have an effective index that increases with increasing temperature.

Slab waveguide 13 is comprised of an undercladding layer 15, a slab core layer 16, and an overcladding layer 17, as shown in FIG. 2, which is a cross-sectional view of a plane perpendicular to planar substrate 14 and parallel to waveguides 12A and 12B. Slab waveguide 13 of component 10 differs considerably from conventional components of this type in which a groove generally corresponding to the space occupied by undercladding layer 15, slab core 16 and overcladding layer 17 of slab waveguide 13 is filled with a material having a refractive index approximately the same as the refractive index of waveguide cores 19 and which decreases with increasing temperature. In such a conventional groove, light may freely propagate in either a horizontal or vertical direction perpendicular to the length of the waveguides. In contrast, undercladding layer 15 and overcladding layer 17 of the component 10 of the invention guide light through slab core 16, effectively eliminating, or at least substantially reducing, vertical free-space propagation losses. A difficulty associated with making a component of the type shown in FIGS. 1–5 is that it has not heretofore been feasible to precisely form an undercladding layer 15 having a planar upper surface that coincides with the underside of core waveguides 19, and/or to precisely form a slab core layer 16 having a planar upper surface that coincides with upper surfaces of waveguide cores 19.

As shown in FIG. 3, ends of waveguide cores 19 abutting slab waveguide 13 are flared in a region 28 immediately adjacent to waveguide 13 (i.e., the width of waveguide cores 19 increases near slab waveguide 13). Flared regions 28 are formed as part of waveguide cores 19 during the lithographic/etching techniques normally employed to form waveguide cores 19. The divergence angle of a light beam entering a free-space propagation region (such as the horizontal plane of slab waveguide 13) is inversely proportional to the dimensions of the light beam transverse to its direction of propagation. Thus, increasing the beam width leads to a lower free-space propagation loss. This is achieved with a progressive increase of the waveguide core width near the entrance of the slab waveguide, as shown in FIG. 3. At the exit of slab waveguide 13, the waveguide width progressively decreases. The gradual variation in waveguide width is necessary to avoid coupling of energy into higher-order modes. For example, a taper angle of 0.5° can be used. In the case of an 80-micron-long slab waveguide (a typical length required for an 8 channel, 200 GHz channel spacing component), and a waveguide width increasing from 6 to 20 microns, the loss due to horizontal divergence can be reduced from 1.5 to 0.2 dB using the flared ends 28.

Slab core layer 16 is comprised of a material that has a refractive index equal to the refractive index of waveguide cores 19 at a temperature near the mid-point of the operating temperature range, in order to minimize the backreflectance from the interfaces between slab waveguide 13 and waveguide segments 12A and 12B over the operating temperature range. Undercladding layer 15 and overcladding layer 17 have a refractive index that is lower than the refractive index of slab core layer 16, and that has a relative difference to the refractive index of slab core layer 16 chosen to minimize the vertical mode profile mismatch between slab waveguide 13 and waveguide segments 12A and 12B. When waveguide cores 19 have flared ends abutting slab waveguide 13, the relative index difference of undercladding layer 15 and overcladding layer 17 with respect to slab core layer 16 is the same as the relative index difference of cladding layers 20 and 22 with respect to the waveguide cores 19. The refractive index of slab core layer 16 decreases with increasing temperature, as well as the effective index of slab waveguide 13 made of undercladding layer 15, slab core layer 16, and overcladding layer 17.

Planar substrate 14 may be any suitable solid substrate having a planar surface capable of supporting a planar waveguide circuit. Suitable materials include silica glass and silicon. When planar substrate 14 is not made of a transparent material having a suitable refractive index, an undercladding layer 20 is used. Hereafter, the description of the exemplary and preferred embodiments of the invention is made assuming the presence of an undercladding layer 20. However, the description can be adapted to the case where no undercladding layer is present by considering the top of planar substrate 14 as an undercladding layer. Undercladding layer 20 may comprise a glass material that is transparent to light at the signal wavelengths. Cladding layer 20 is typically made of silica glass or lightly doped silica glass, and typically has a refractive index of about 1.444–1.445 at 1550 nm. Cladding layer 20 may be formed on substrate 14 using various conventional deposition techniques. For example, undercladding layer 20 may be deposited on substrate 14 using any suitable deposition technique including physical vapor deposition (PVD) processes such as sputtering, electron-beam evaporation, molecular-beam epitaxy, and chemical vapor deposition (CVD) processes including flame hydrolysis deposition (FHD), atmospheric pressure chemical vapor deposition (APCVD), low-pressure chemical vapor deposition (LPCVD), plasmaenhanced chemical vapor deposition (PECVD). For typical integrated optical components, flame hydrolysis deposition (FHD) and plasma-enhanced chemical vapor deposition (PECVD) have been the most widely utilized methods because of low waveguide propagation losses and excellent compositional and thickness uniformity. As another alternative, sol-gel techniques may be employed for depositing and forming undercladding layer 20. Typically, undercladding layer 20 is deposited over the entire upper surface of substrate 14 to a uniform thickness. Thereafter, a core layer (which is later etched to form waveguide cores 19) is deposited over cladding layer 20 using generally any of the techniques previously described for applying layer 20 on substrate 14. The core layer is typically a glass, or crystalline material having a suitable transparency to the signal wavelengths, and having a refractive index that increases with increasing temperature. Typically, waveguide cores 19 have a refractive index that is about 0.2% to about 2%, more typically from about 0.3% to about 1%, and even more typically, about 0.75% higher than the refractive index of undercladding layer 20.

After the core layer has been uniformly deposited on undercladding layer 20, and before deposition of overcladding layer 22, the core layer is patterned as desired using conventional lithographic and etching techniques to form waveguide cores 19. Typically, a photo-resist material is applied to the upper surface of the core layer, exposed to radiation through a mask to either cure or degrade the photo-resist material (depending upon whether a positive or negative photo-resist is used), and thereafter, the uncured or degraded portions of the photo-resist are removed with a stripping compound to expose those portions of the core layer that are to be removed by etching. Conventional etching techniques, such as plasma etching, can be used to transfer the pattern from the photo-resist to the core layer. After the core layer has been patterned to define waveguide cores 19, an overcladding layer 22 is deposited over the patterned core and exposed undercladding 20, whereby waveguide cores 19 are completely surrounded by cladding layers 20 and 22. Waveguides 12A, 12B, 11, 23, and couplers 18, 20 are defined by cladding layers 20, 22, and patterned waveguide cores 19.

Slab waveguide 13 is formed by first forming a corresponding generally triangular-shaped groove through overcladding layers 22, waveguide cores 19, and undercladding layer 20. Conventional lithographic and etching techniques may be employed for forming the triangular groove.

After the generally triangular-shaped groove has been etched, slab waveguide 13 comprising undercladding layer 15, slab core 16, and overcladding layer 17 is formed, with slab core 16 vertically aligned with waveguide cores 19. The process for forming slab waveguide 13 involves three applications of polymer or hybrid sol-gel material, two planarization steps, and three cure steps. Slab core 16 is comprised of a material having a refractive index that decreases with increasing temperature. More specifically, the width of the gap through which light must traverse slab waveguide 13 to pass from a waveguide section 12A on one side of component 10 to a corresponding waveguide section 12B on the other side of component 10, and the variation in the refractive index with temperature for slab core 16 are selected (or adjusted) to compensate for a temperature-induced variation of the refractive index of the curved waveguide cores 19, whereby a constant optical path length difference between adjacent waveguides is maintained over the operating temperature range. Desirably, slab waveguide cladding layers 15 and 17 have a refractive index variation with temperature (dn/dT) that is about the same as the refractive index variation with temperature of slab core 16, whereby the difference between the refractive index of slab core 16 and cladding layers 15 and 17 remains relatively constant over the operating temperature range. The materials used to form undercladding layer 15, slab core layer 16, and overcladding layer 17 of slab waveguide 13 are deposited in a liquid form that is subsequently hardened or cured either by thermal processing or by exposure to radiation, such as ultraviolet radiation. Suitable curable polymer compositions and solgel compositions that may be used for forming slab waveguide 13 are well known.

Figure 6:
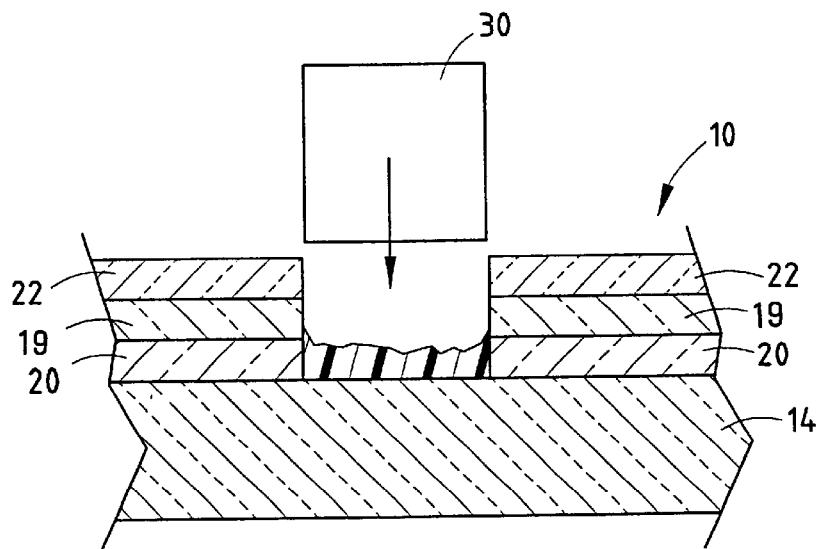
FIG. 6 is a cross-sectional schematic view showing a first step in a method of forming the slab waveguide shown in FIGS. 1–5, with the elements of FIG. 6 corresponding to those of the waveguide shown in FIG. 2.

The process for forming slab waveguide 13 is schematically illustrated in FIGS. 6 through 9. FIG. 6 shows a partially completed optical phased-array component including a planar substrate 14, waveguides defined by an undercladding layer 20, waveguide cores 19, and an overcladding layer 22, and including a groove in a central or intermediate section of the phased array that divides each of a plurality of curved waveguide cores 19 in the phased array into a first waveguide core segment and a second waveguide core segment that is separated from the first waveguide core segment by a free space. Undercladding layer 15 of slab waveguide 13 is formed in the groove by depositing a suitable polymer or sol-gel solution into the bottom of the groove, aligning a tool 30 horizontally, referencing it vertically, and inserting it to the original level of the substrate material. The amount of material deposited in the bottom of the groove is an amount slightly in excess of the amount needed to fill the groove to a level that coincides with the underside of waveguide cores 19. To avoid entrapment of bubbles between the tool 30 surface and the material surface, an excess of material sufficient to fill the groove and form a convex surface may be used. The excess material can be squeezed out of the groove between the groove side wall and the tool side wall, resulting in a small plateau of material at the top surface of the device.

Figure 7:
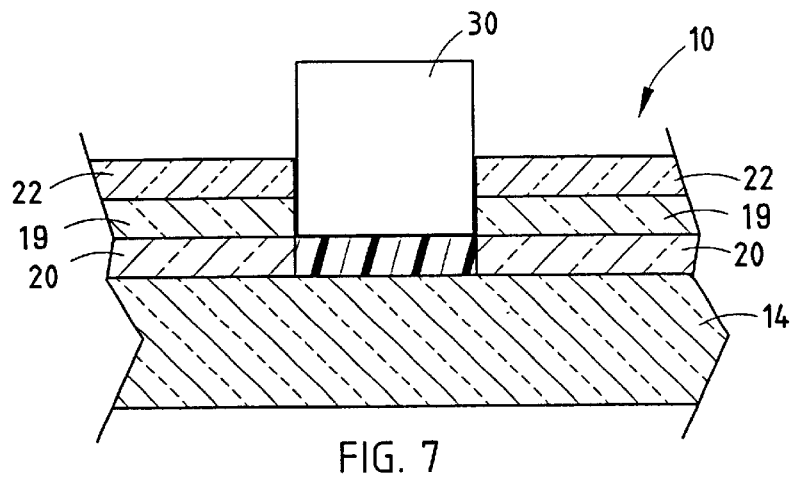
FIG. 7 is a cross-sectional schematic view showing a subsequent step in the method of forming the slab waveguide shown in FIG. 6, with the elements of FIG. 7 corresponding to those of the waveguide shown in FIG. 2.
Figure 8:
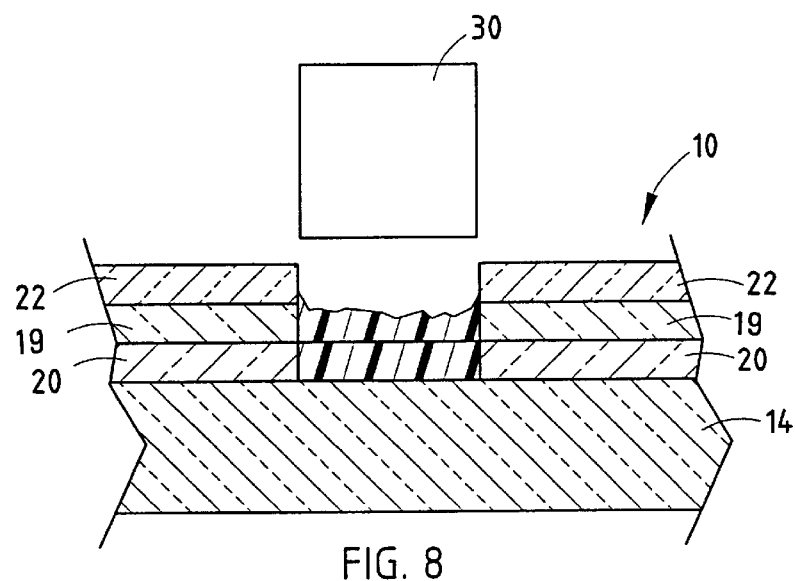
FIG. 8 is a cross-sectional schematic view showing a subsequent step in the method of forming the slab waveguide shown in FIGS. 6 and 7, with the elements of FIG. 8 corresponding to those of the waveguide shown in FIG. 2.
Figure 9:
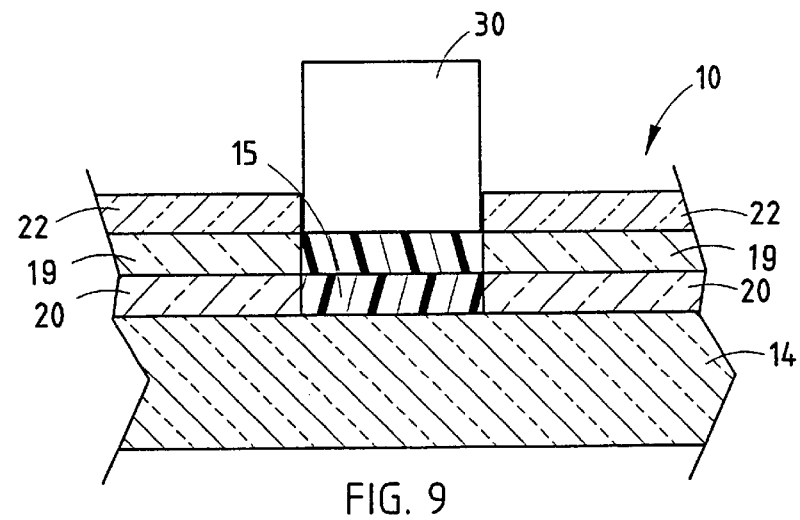
FIG. 9 is a cross-sectional schematic view showing a subsequent step in the method of forming the slab waveguide shown in FIGS. 6–8, with the elements of FIG. 9 corresponding those of the waveguide shown in FIG. 2.

After the lower face of tool 30 has been properly positioned at the level coinciding with the underside of waveguide cores 19 as seen in FIG. 7, the undercladding material (e.g., polymer or sol-gel solution) is cured as appropriate. After curing, tool 30 is removed, an undercladding layer 15 results and has a flat upper surface aligned with the planar interface between undercladding layer 20 and waveguide cores 19. Next, as illustrated in FIG. 8, a polymer or sol-gel solution suitable for forming the relatively higher refractive index slab core 16 is deposited in the groove. Again, the amount of material that is deposited is slightly in excess of the amount needed to fill the volume of the groove defined between the upper surface of undercladding layer 15 and a plane defined by the interface between waveguide cores 19 and overcladding 22. The higher refractive index material is then planarized by realigning tool 30 vertically inserting tool 30 to the horizontal level of the interface between waveguide cores 19 and overcladding 22. The second tool 30 used in this step differs from the first tool 30 because it must fit into the imprint left by the first planarization step, so it is smaller by a tolerance of at least one micron and possibly up to 2–3 microns. With tool 30 in place as seen in FIG. 9, the higher refractive index material is appropriately cured to form slab core 16. Tool 30 is then removed leaving a flat upper surface on slab core 16 that is aligned with the interface between waveguide cores 19 and overcladding 22. Thereafter, an excess of overcladding material is deposited into the groove over core 16, and cured to complete slab waveguide 13 as seen in FIG. 2.

An important aspect of this invention is the ability to planarize the upper surface of undercladding layer 15 at a level coinciding with the interface between waveguide cores 19 and undercladding layer 20 of waveguides 12A and 12B, and the ability to planarize the upper surface of slab core layer 16 at a level coinciding with the interface between waveguide cores 19 and overcladding 22 of waveguides 12A and 12B. Signal loss in the component is very sensitive to the precision at which these two layers can be matched to waveguides 12A and 12B. Therefore, the vertical position of tool 30 must be precisely controlled during the cure of the undercladding 15 and during the cure of slab core 16. Because the thickness of overcladding layer 22 is variable, and the texture of both the groove and the top surfaces of the component are rough, there is no easy method of determining the depth of the waveguide cores 19 after normal processing. In order to overcome these difficulties, a tool mount is attached to a commercially available positioning stage such that the relative vertical position of the tool can be controlled to within less than 0.1 microns. The absolute position of the tool relative to the core requires a positioning point to be developed into component 10.

Positioning pads 40 as seen in FIG. 1 may be incorporated into component 10 by depositing a small patch of an etch-stop material (i.e., a material which is very resistant to the etchant used during etching the groove) on either undercladding layer 20 or the material comprising waveguide cores 19. Pads 40 are located in a region near the groove where there are no waveguides. The etch-stop material can, for example, be silicon. The etch-stop material can be deposited as a planar layer and subsequently patterned to define the positioning pads. After forming positioning pads 40, the component is processed with subsequent deposition, photolithography, and etch steps, as previously described. During the step when the groove is to be etched, the photomask that includes the groove pattern is designed to expose the glass above the positioning pads. During the deep-etch of the groove, the positioning pads are exposed. After exposure of the etch-stop or positioning pads (i.e., after the glass above the etchstop has been etched), the etch-stop has to withstand the etching for the remaining time of the etch step. For example, if waveguide cores 19 are 6 microns thick, and if the groove bottom is to be 10 microns deeper than the level of the interface between undercladding 20 and waveguide cores 19, then the etch-stop (positioning pad) must be sufficiently resistant to the etchant to remain substantially intact during etching of 6 microns of core material and 10 microns of undercladding material when the etch-stop or positioning pad is on a portion of the material used to form waveguide cores 19, or while etching 10 microns of undercladding when the etch-stop or positioning pad is on substrate 14. If the selectivity (ratio of the etch-stop etch rate to the waveguide material etch rate) is about 10, the etch-stop thickness should be at least 1.6 microns when the etch-stop or positioning pad is on material used to form waveguide cores 19, or at least about 1 micron when the etch-stop or positioning pad is on substrate 14.

The positioning pads 40 provide an absolute position for either the top or bottom surfaces of waveguide cores 19. A series of three non-linearly arranged pads 40 can be used to level a tool relative to the top of undercladding layer 20 or of the deposited core 19. The tool fixture includes a probe that detects the position of the pads, and allows subsequent positioning of tool 30 to be referenced to the absolute position of waveguide cores 19. Various commercially available probes, which may allow visual, electrical, optical or mechanical detection of contact with the positioning pads, can be used.

The tool 30 needed for planarization of the upper surface of undercladding layer 15 and slab core 16 of slab waveguide 13 has a flat bottom surface contoured to the groove. Because the tool must be inserted into the groove, it should be slightly undersized to allow some tolerance to prevent damage to component 10. The tool may be formed by using the etched groove as a mold for a cast silicone tool. A suitable silicone fluid that is castable into a solid polymeric material is commercially available from Dow-Corning. The silicone fluid is mixed and cast into the groove. It is beneficial to further provide a mount to which the tool will be affixed during later process steps. The silicone is cured following the manufacturer's recommendations. The undersized tolerance in this case is developed intrinsically since the silicone is cured at 150° C., and has a coefficient of expansion of about $10^{-4}$ per degree C, the tool shrinks on cooling to room temperature by about 1%. However, the gap between the tool and the groove is proportional to the tool dimension, and is then larger at the large end of the tool. In order to avoid this and keep a constant undersize, a groove of different dimensions, chosen to accommodate the tool shrinkage, can be etched in another region of component 10.

Another complication that may be encountered when the groove is used as the mold is that the bottom surface of the groove may be rough. Since the overclad layer is deposited onto a ridged array of waveguides, the top surface of the core/clad interface is wavy with the period of the waveguides. During the deep-etch process, the core and clad compositions may etch at different rates, further exacerbating the bottom-surface roughness. To avoid this problem, a groove of exactly the same shape can be etched into a region of the wafer where no core pattern is present. The bottom surface of such a groove will be smooth and flat, and would serve as a mold for the functional groove. Other methods of making an appropriate tool include the use of lithography/etching where hard materials such as silicon or silica could be used. Nickel tools could be made by replication off of a master negative. These general methods are well known in the art.

Figure 10:
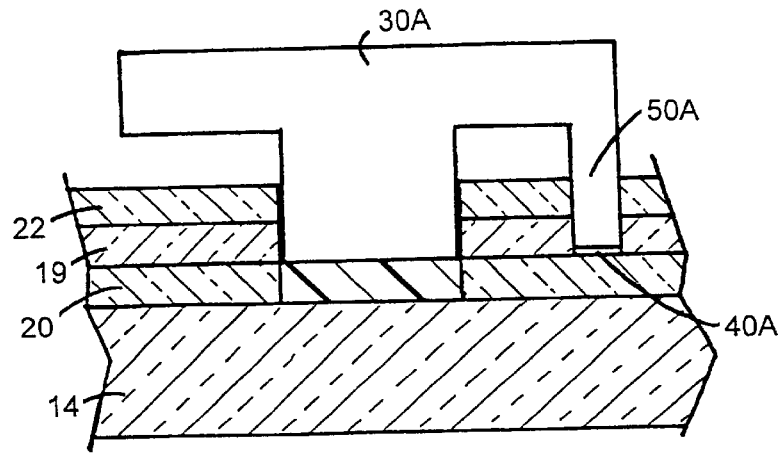
FIGS. 10–12 are cross-sectional schematic views showing examples of how a planarization tool may be constructed and utilized for planarization of polymeric materials deposited in a groove during fabrication of an athermalized integrated optical WDM component.
Figure 11:
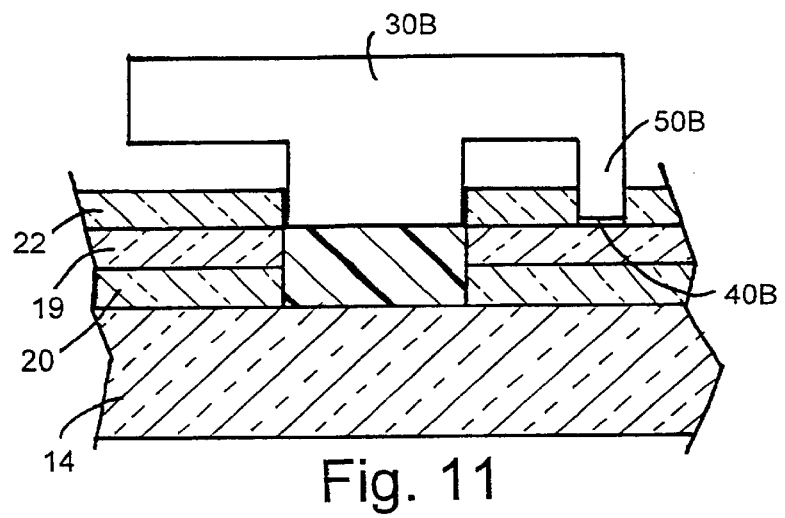
Figure 12:
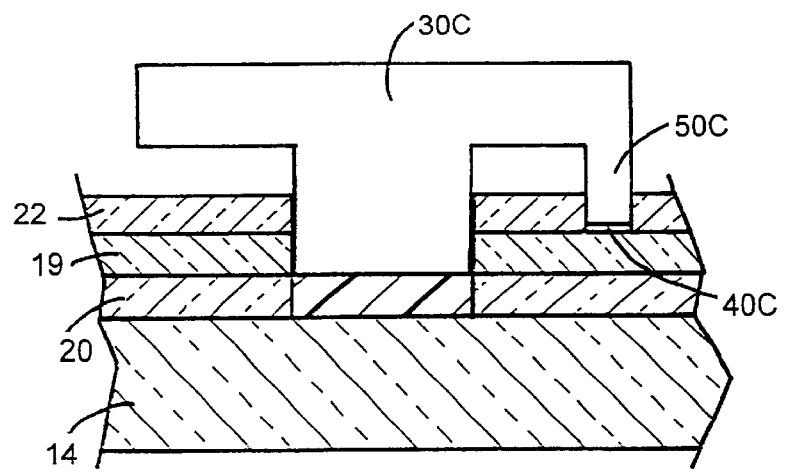

Establishing an accurate position for planarization by the tool 30 in the groove may be accomplished by direct mechanical contact of the tool 30 with the etch stop pads 40. In this case, tool 30 is made (via photolithography and reactive ion etching) with pegs 50 that fit into a well or groove etched through layer 22 or through layers 19 and 22 above the etch stop pads 40. In this way, the position of tool 30 relative to core layer 19 in device 10 is not dependent on any machine parameters. FIGS. 10–12 show examples of tool 30 and groove architecture that can be used to achieve coplanar fabrication of the slab waveguide in the groove of device 10. In FIG. 10, the planarization surface (bottom surface) of tool 30A and the bottom surface of peg 50A are coplanar, while the etch stop pad 40A is at the substrate level. This architecture enables underclad planarization. In FIG. 11, the planarization surface of tool 30B and the bottom surface of peg 50B are coplanar, and etch stop 40B is on the top surface of core layer 19. This architecture enables core planarization. In FIG. 12, tool 30C is fabricated with the bottom surface of peg 50C being a distance above the planarization surface of tool 30C that is equal to the thickness of core layer 19, while etch stop pad 40C is located at the top surface of core layer 19. This architecture enables underclad planarization. Other geometries can also be developed for planarization of the layers.

The vertical component of free-space propagation loss is effectively eliminated, or at least substantially reduced, by the slab waveguide 13 described above. However, the component may be further modified to comprise features that limit free-space propagation lengths or collimate light to reduce horizontal free-space propagation losses. For example, the horizontal component of free-space propagation loss may be managed by developing channel waveguides by embossing, transfer molding, or ultraviolet inscription. Using these techniques, the channel waveguides are precisely aligned to waveguides 12A and 12B to transmit light without free-space propagation losses.

For embossing, a soft layer of core material may be deposited onto an underclad. A tool 30 is made with the shape of the groove and with a surface parallel to the optical plane shaped with the negative structure of the waveguides to be written. The tool is inserted into the groove, presses and forms the waveguides in the core layer. The core material is cured, either thermally or with radiation, and the tool is released and removed.

A similar tool can be used to transfer-mold a pattern onto an underclad surface. Here, the core layer is doctored into the waveguide pattern, and is partially or entirely cured. The tool is inserted into the groove and contacts the undercladding. The surface energetics must be tailored to allow the tool to release, while bonding the core pattern to the underclad.

For photo-inscription, the tool is a photomask that is precisely positioned over a bi-layer structure. Planar layers of an underclad that is not photosensitive, and a core precursor that is photosensitive, are aligned vertically with the waveguides. The photomask is positioned so that a UV source impinges on the region of the core precursor where the waveguide cores are to be developed. The exposure develops the precursor so that either an index change of sufficient strength is directly induced in the exposed regions to permit waveguiding, or the exposed region may become relatively durable compared to the unexposed region. In the latter case, the additional step of developing the waveguides by etching the unexposed regions, such as with an appropriate solvent, is necessary to complete the process.

In each case, the tool must be aligned with the waveguide array with great precision. One approach to achieving that is to provide calibrated vernier scales on both the tool and the component. Such an approach is known and is used in microchip technologies.

The principles of this invention may be adapted for making a component similar to component 10, in which undercladding layer 20 is eliminated, and in which substrate 14 is comprised of a material suitable for functioning as an undercladding layer. In this case, the groove in which slab waveguide 13 is formed is etched to a depth below the upper surface of substrate 14. Thereafter, the techniques for forming undercladding layer 15, slab core layer 16, and overcladding layer 17 of slab waveguide 13 are analogous to the steps described above.

It will become apparent to those skilled in the art that various modifications to the preferred embodiments of the invention as described herein can be made without departing from the spirit or scope of the invention as defined by the appended claims.

What is claimed is:

1. A temperature-compensated integrated optical component fabricated on a substrate, the substrate having an upper surface, the substrate either including an undercladding disposed on the upper surface thereof or the substrate acting as the undercladding itself, the temperature-compensated integrated optical component comprising:

an optical phased array disposed on the substrate, the optical phased array defined by a plurality of waveguide cores and an overcladding disposed on the plurality of waveguide cores such that the plurality of waveguide cores are interposed between the undercladding and the overcladding, the plurality of waveguide cores having an index of refraction that increases with increasing temperature, the optical phased array having an intermediate section defining a groove, each of the plurality of waveguide cores having a lower surface and an upper surface, the groove extending downwardly to a depth lower than the bottom surface of the waveguide cores; and a slab waveguide located within the groove at the intermediate section of the optical array, the slab waveguide including an undercladding layer disposed at the bottom of the groove, the undercladding layer having an upper surface located in a plane generally coinciding with the lower surfaces of the plurality of the waveguide cores, a slab core layer disposed over the undercladding layer of the slab waveguide, the slab core layer having an index of refraction that decreases with increasing temperature to compensate for a temperature-induced change in the refractive index of the plurality of waveguide cores and maintain a generally constant optical path difference between the adjacent ones of the plurality of waveguide cores over a temperature range, the slab core layer having an upper surface in a plane generally coinciding with the upper surfaces of the plurality of waveguide cores, and an overcladding layer disposed over the slab core layer.

2. The temperature-compensated integrated optical component of claim 1 wherein the slab core layer is selected from a group consisting of a cured polymer material or a cured sol-gel material.

3. The temperature-compensated integrated optical component of claim 1 wherein the plurality of waveguide cores of the optical phased array have a width and a length, the plurality of waveguide cores and the slab waveguide defining an interface there between, the width gradually increasing along the length of the plurality of waveguide cores from a location removed from but in close proximity to the slab waveguide toward the interface between the plurality of waveguide cores and the slab waveguide.

4. The temperature-compensated integrated optical component of claim 1 wherein the temperature-compensated integrated optical component is a wavelength division multiplexer or demultiplexer of the phased-array type.

5. The temperature-compensated integrated optical component of claim 4 wherein the plurality of waveguides cores define an arcuate waveguide array extending between a first end and a second end, and the intermediate section defining the groove is disposed generally centered within the arcuate waveguide array between the first end and the second end.

6. The temperature-compensated integrated optical component of claim 1 wherein the plurality of waveguide cores are each generally coplanar with one another and are curved.

7. The temperature-compensated integrated optical component of claim 1 wherein the undercladding layer within the groove is disposed on the upper surface of the substrate.

8. A method for making a temperature-compensated integrated optical component comprising the steps of:

providing an optical component including a substrate and a plurality of waveguide cores of different lengths, the substrate either including an undercladding disposed thereon or the substrate acting as the undercladding itself, the plurality of waveguide cores disposed on the undercladding, an intermediate section of the optical component defining a groove which extends downwardly to a depth lower than the bottom surface of the waveguide cores and which divides each of the plurality of waveguide cores into a first waveguide core segment and a second waveguide core segment separated from the first waveguide core segment by a free space; and forming an undercladding within in the groove, the undercladding within the groove having an upper surface located in a plane generally coinciding with the lower surfaces of the plurality of waveguide cores;

forming a slab core within the groove, the slab core having an index of refraction that decreases with increasing temperature to compensate for a temperature-induced change in the refractive index of the plurality of waveguide cores and maintains a generally constant optical path length difference between adjacent ones of the plurality of waveguide cores over a temperature range.

9. The method of claim 8 further comprising the step of:
forming an overcladding over the slab core.

10. The method of claim 8 wherein the plurality of waveguide cores have an underside, and the step of forming the undercladding within the groove comprises the steps of:

depositing an amount of a curable liquid composition that is slightly in excess of an amount needed to fill the groove to a level defined by the underside of the plurality of waveguide core;

inserting a tool having a bottom surface into the groove to a depth whereat the bottom surface of the tool is generally at a level coinciding with the underside of the waveguide cores; and curing the curable liquid composition to form the undercladding in the groove.

11. The method of claim 10 wherein the liquid composition is selected from a group consisting of a curable polymeric composition or a curable sol-gel composition.

12. The method of claim 8 wherein the plurality of waveguide cores have upper surfaces, and wherein the step of forming the slab core comprises the steps of:

depositing an amount of a liquid composition that is slightly in excess of the amount needed to fill a space above the undercladding within the groove to a level generally coinciding with the upper surfaces of the plurality of waveguide cores;

inserting a tool having a bottom surface into the groove to a level whereat the bottom surface of the tool generally coincides with the level of the upper surfaces of the plurality of waveguide cores; and curing the slab composition to form the slab core.

13. The method of claim 12 wherein the liquid composition is selected from a group consisting of a curable polymeric composition or a curable sol-gel composition.

* * * * *

UNITED STATES PATENT AND TRADEMARK OFFICE
CERTIFICATE OF CORRECTION

PATENT NO. : 6,466,707 B1
DATED : October 15, 2002
INVENTOR(S) : Steven B. Dawes et al.

It is certified that error appears in the above-identified patent and that said Letters Patent is hereby corrected as shown below:

<u>Title page,</u>
Item [75], Inventors, "sur" should be -- Sur --.

<u>Column 2,</u>
Line 20, "phasedarray" should be -- phased-array --.
Lines 22 and 23, "phased array" should be -- phased-array --.

<u>Column 3,</u>
Line 51, "freespace" should be -- free-space --.

<u>Column 4,</u>
Line 42, "this" should be -- that --.
Line 45, "have" should be -- has --.

<u>Column 5,</u>
Line 60, after "embodiment" insert -- of --.
Line 63, "phased-array" should be -- phased array --.

<u>Column 6,</u>
Line 12, "Figures" should be -- figures --.

<u>Column 8,</u>
Line 2, "plasmaenhanced" should be -- plasma-enhanced --.

<u>Column 9,</u>
Line 12, "solgel" should be -- sol-gel --.

UNITED STATES PATENT AND TRADEMARK OFFICE
CERTIFICATE OF CORRECTION

PATENT NO.     : 6,466,707 B1
DATED          : October 15, 2002
INVENTOR(S)    : Steven B. Dawes et al.

It is certified that error appears in the above-identified patent and that said Letters Patent is hereby corrected as shown below:

<u>Column 10,</u>
Line 39, "etchstop" should be -- etch-stop --.

Signed and Sealed this

Eighteenth Day of February, 2003

JAMES E. ROGAN
*Director of the United States Patent and Trademark Office*